Oct. 21, 1958 J. H. JONES, SR 2,857,172
FLUID CONTROL VALVE
Filed May 28, 1956 2 Sheets-Sheet 2

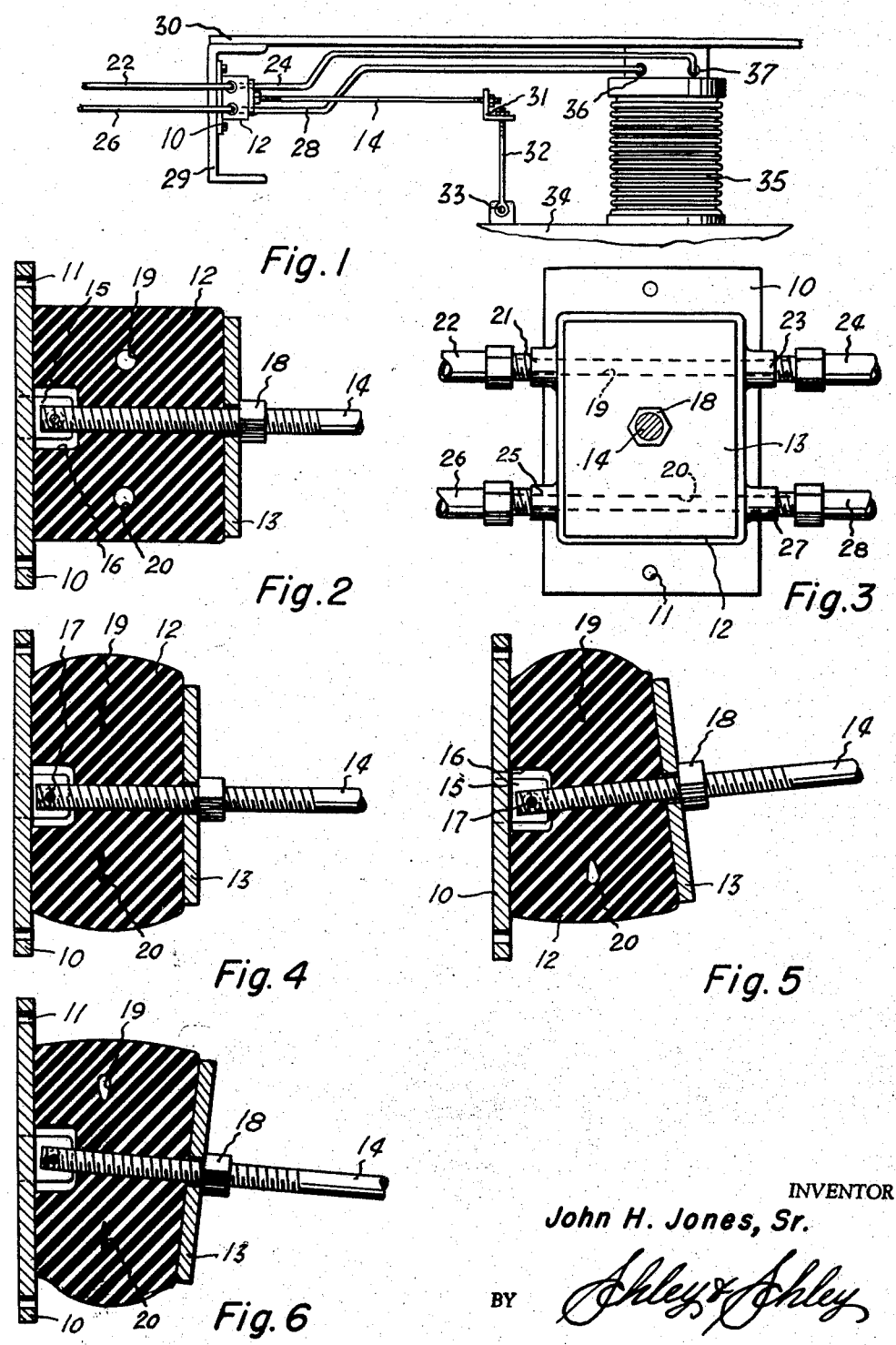

INVENTOR
John H. Jones, Sr.
BY Ashley & Ashley
ATTORNEYS

United States Patent Office 2,857,172
Patented Oct. 21, 1958

2,857,172

FLUID CONTROL VALVE

John H. Jones, Sr., Fort Worth, Tex., assignor to Sam Hastings Jones, Flossmoor, Ill.

Application May 28, 1956, Serial No. 587,514

10 Claims. (Cl. 280—124)

This invention relates to new and useful improvements in fluid valves.

The invention is particularly concerned with fluid valves responsive to mechanical motion to open and close pressure fluid inlets and outlets in accordance with the relative movement of mechanical elements to which the valve is attached.

In many instances, the relative movement of one mechanical element to another mechanical element may desirably be employed for the actuation of valve means, either for the admission of a fluid under pressure to a pressure operated mechanism, or for exhaust of such fluid therefrom, or both, and in such instances, the present invention finds effective use.

As a specific example, it often happens that a relatively heavily laden motor vehicle, such as a motor truck or other conveyance of relatively heavy loads, may encounter operating and loading conditions which tend to cause the load bearing frame or structural member of the truck or other conveyance to assume other than a horizontal or normal position, and in such instances, it is often desirable to provide means for effectuating the return of the load bearing body member of the vehicle to a substantially horizontal position. Obviously, in the various road conditions encountered by a motor vehicle, as well as the various inclinations of the road surface, both longitudinally and transversely, the maintaining of a load supporting frame structure or member of such a vehicle horizontal under various operating conditions is an appreciable problem.

The foregoing is recited only as a single instance of a load bearing problem in which the relative movement of two structural elements, in the foregoing instance, the motor truck frame and the motor truck wheel suspension means, creates a leveling problem, and numerous other instances of use and application of the invention will be apparent to those skilled in the art.

It is, therefore, a specific object of the invention to provide an improved valve means which may be incorporated into a motor truck or vehicle for providing automatic leveling compensation for the load supporting surface or platform of the vehicle in accordance with the loading of said platform and the relative disposition of the supporting frame with respect to the wheel suspension means.

A further object of the invention is to provide a structure of the character described in which means is provided for compensating the structure in accordance with the instantaneous loading conditions of the vehicle or other unit whereby response of the structure to momentary loading conditions is eliminated and erratic or haphazard actuation of the pressure fluid means is avoided.

Yet another object of the invention is to provide a structure of the character described in which a resilient element is provided with valve passages, the element being responsive to loading conditions for opening or restricting the valve passages, and in which supplementary chambers may be provided in the resilient body for response to the loading or non-loading of the associated, load-supporting structure, whereby momentary over or under loading of the structure correspondingly affects the operation of the valving means and prevents the random or erratic operation thereof in response to rapidly or quickly varying loading conditions, such as would be encountered by a motor vehicle traveling over a roadway with a rough surface.

A construction designed to carry out the invention will be hereinafter described, together with other features of the invention.

The invention will be more readily understood from a reading of the following specification and by reference to the accompanying drawings, wherein examples of the invention are shown, and wherein:

Fig. 1 is a schematic view illustrating the invention as applied to a relatively fixed supporting member and a movable supporting member, and associated with variable means for adjusting the distance between the two members, Fig. 2 is a vertical, sectional view, of a valve structure constructed in accordance with this invention and showing the valve structure prior to distortion thereof, Fig. 3 is a front elevational view of the valve structure of Fig. 2, Fig. 4 is a vertical, sectional view of the valve structure shown in Fig. 2, the valve structure having been distorted into customary operating position, Fig. 5 is a view similar to Fig. 4 and showing the functioning of the valve structure in accordance with movement of the actuating arm, Fig. 6 is a view similar to Fig. 5 and showing the functioning of the valve structure under opposite movement of the actuating arm, Fig. 7 is a schematic view showing the application of a modified form of the invention, Fig. 8 is a vertical, sectional view of the modified form of the valve structure.

Figure 7:
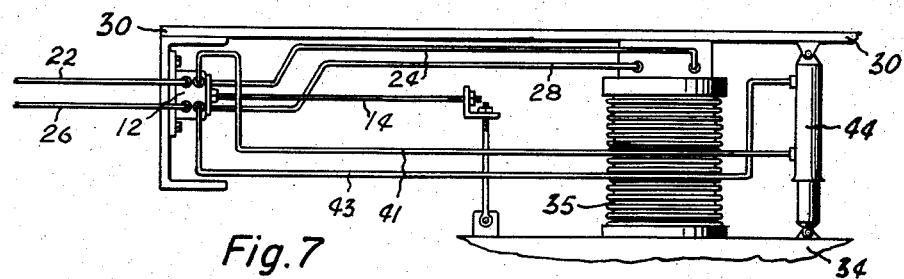
Figures 8, 9:
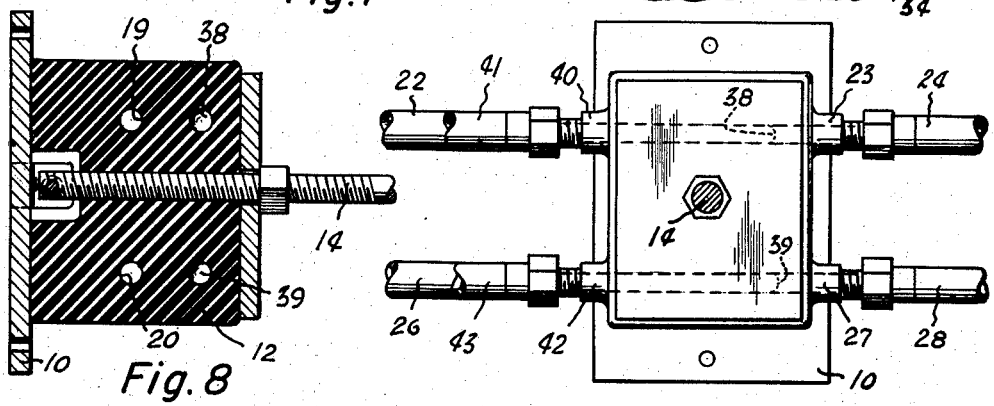
Fig. 9 is a front elevational view of the modified valve.

While the valve structure of this invention is adapted to many and varied purposes and uses, for simplicity and clarity, it will be described largely in respect to its use in conjunction with a hydraulic or pneumatic stabilizing system for leveling a supporting structure with relation to a frame structure, for instance, the leveling of a truck bed with respect to the suspension means thereof.

In connection with this specific use of the invention, it has been found desirable in larger motor trucks to provide for leveling of the supporting structure or load bearing bed of the truck body regardless of the degree of inclination of the frame of the truck. Thus, upon roads or highways which have a lateral inclination, it is desirable to level the bed of the truck to eliminate the tendency of the bed to tilt or shift sideways under the considerable load which may be supported thereon.

The valve structure includes a supporting plate member 10 having bolt receiving apertures 11 for securing the plate to one of the members between which motion or angular relationship is to be controlled. A block 12 of rubber or rubber-like material, suitable synthetic resin, or other elastic material capable of ready distortion under the application of a load, abuts the plate 10 and receives on its outer face a movable plate 13 spaced from the plate 10 and positioned in a plane parallel thereto.

For clamping the plates 10 and 13, an elongate screw-threaded rod 14 extends through the plate 13 and the block 12, and is connected in a pivotal fashion to the plate 10 by means of a clevis 15 projecting inwardly from the central portion of the plate 10 into a recess 16 formed in the abutting wall of the block 12. The end of the rod 14 is pivotally connected to the clevis 15 by a transverse pin 17, and a nut 18, positioned on the rod 14 outwardly of the plate 13, constantly urges the plate 13 and the block 12 toward the plate 10. As will appear more fully hereinafter, the rod 14 may be of considerable length, and may desirably have its outer end joined or suitably connected to the other of the members which is to be kept under angular or positional control. Thus, relative movement between the members results in swinging of the rod 14 with respect to the plate 10 and the consequent distortion of the block 12 on one side or the other of the rod 14.

The block 12 is provided with a first transverse bore 19 extending throughout the width of the block in a direction perpendicular to the axis of the rod 14 and in a horizontal plane above that of the rod 14. The block is also formed with a second transverse bore 20, substantially identical to the bore 19 and extending through the block perpendicularly to the axis of the rod 14 and in a horizontal plane spaced below the rod 14. Thus, as the rod 14 is swung upwardly, there is a tendency to distort and close the bore 19 while leaving the bore 20 open, and as the rod 14 is swung downwardly, there is a tendency to obstruct and close the bore 20 while leaving the bore 19 open. An inlet fitting 21 is provided at one end of the bore 19 for connection to a suitable hose, pipe, or other conductor 22, and a similar outlet fitting 23 is provided at the opposite end of the bore 19 for receiving a conductor 24. Likewise, the bore 20 is provided at its inlet end with an inlet fitting 25 receiving a conductor 26, and at its opposite end with an outlet fitting 27 receiving a conductor 28. Of course, and dependent upon the particular use for which the valve is to be employed, either end of either bore may be used as an inlet or an outlet, and the inlet ends of the bores are not necessarily on the same side of the block 12.

In the specific use of the valve member to which reference has been made hereinabove, the valve structure shown in Fig. 2 may be attached through the plate 10 to the side channel or frame member 29 of a motor truck bed 30. The rod 14 may be extended and connected at right angles, as shown at 31, to the upper end of a shorter rod 32 pivotally connected at 33 to a member 34 of the truck suspension means. Desirably, this structure is duplicated at the opposite side of the truck chassis and body or bed, so that as the bed tilts transversely with respect to the suspension means of the truck, relative upward or downward movement of the rods 14 will result.

To insure level positioning of the bed 30, a bellows, or piston-type ram 35 is positioned between the frame 34 and the bed 30 and has its pressure fluid inlet 36 receiving the conductor 28, while its exhaust fitting or outlet 37 receives the conductor 24. The conductor 26 of the valve structure leads to a suitable source of fluid under pressure, while the conductor 22 leads to a point of pressure fluid exhaust.

In such an installation, it is desirable to tighten the nut 18 upon the rod 14 so that, when the truck is sitting on a level surface and both the members 34 and bed 30 are level with respect to each other and the ground surface, both the passages 19 and 20 will be distorted and closed to prevent the flow of pressure fluid to the bellows member 35, as well as the exhaust of pressure fluid therefrom. Then, as the truck assumes different positions and the bed 30 tends to assume a non-level position, the rod 14 will be flexed upwardly or downwardly to open either the pressure fluid inlet passage 20 or to open the exhaust passage 19 and correspondingly lengthen or shorten the bellows member 35 so as to position the bed 30 in a level plane regardless of the position of the suspension member 34.

Referring to Fig. 1, it will be seen that as the outer edge of the bed 30 adjacent the side channel 29 moves downwardly, the valve member will be flexed by the rod 14 into the position shown in Fig. 5, whereby the passage 19 is maintained closed while the passage 20 will be opened to admit pressure fluid to the bellows 35 and cause the partial expansion of the bellows and upward movement of the lefthand side of the truck bed 30, as viewed in Fig. 1. Similarly, upward movement of the suspension member will result in flexing of the valve member in the opposite direction and the exhausting of fluid from the bellows 35 to tend to lower the truck bed. Thus, the valve member reacts to supply pressure fluid to the bellows 35, or to exhaust fluid therefrom, and to compensate automatically for movement of the supporting bed 30 from a horizontal plane.

It is quite apparent that the elements 30 and 34 may represent any frame or mechanical elements which undergo movement relative to one another, and that the valve member may be connected therebetween for controlling the flow of pressure fluid to and from any suitable element, such as the bellows 35, for automatically adjusting the relative position between the elements 30 and 34 as they tend to move with respect to one another.

Under some conditions, relatively rapid and random movement between the elements 30 and 34 may occur, as for instance, when the elements are subjected to a momentary, vibratory condition, such as would occur in a motor truck passing momentarily over a relatively rough road surface. In this case, opening of the passages 19 and 20 in response to such momentary conditions would not be desirable, and accordingly, the valve structure may be modified as shown in Figs. 7 through 11.

The valve structure, as modified, is substantially identical to that previously described, but includes, in addition to the passages 19 and 20, supplementary elongate pockets 38 and 39 spaced from but parallel to the passages 19 and 20, respectively. The pocket or recess 38 is provided with an inlet fitting 40 receiving a hose, pipe, or other conductor 41, and the pocket or recess 39 is provided with an inlet fitting 42 receiving a conductor 43. The recesses 38 and 39 do not form passages through the block 12, but rather, form pressure fluid receiving recesses in the block subject to the action of a pressure fluid therein for distorting the block immediately adjacent the passages 19 and 20. Thus, the application of pressure within the recess 38 will tend to distort the structure of the block 12 to close the passage 19, whereas the application of pressure in the recess 39 will tend to close the passage 20.

As illustrated in Figs. 5 and 6, the flexing of the block 12 by lateral movement of the rod 14 upwardly or downwardly, will tend to open the passage 20 or the passage 19. By the proper application of pressure within the recesses 38 and 39, such opening of the passages 19 and 20 may be prevented even though the rod 14 is moved upwardly or downwardly and would normally open said passages.

Figure 10:
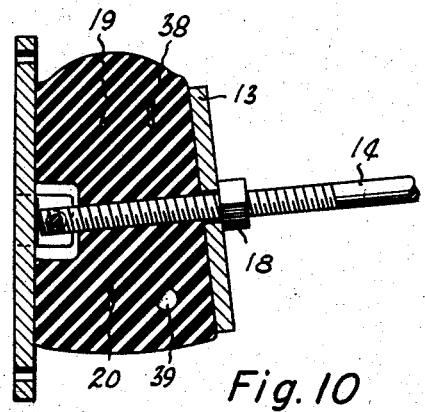
Figs. 10 and 11 are vertical, sectional views illustrating the functioning of the modified valve structure.
Figure 11:
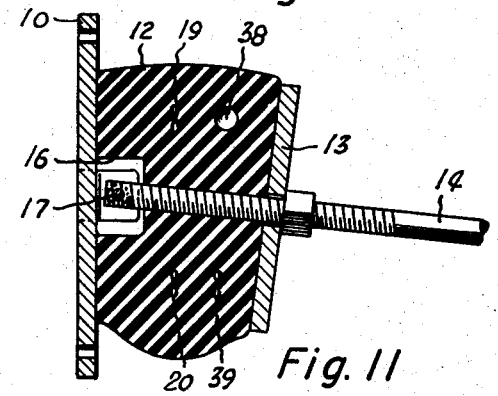
Figure 12:
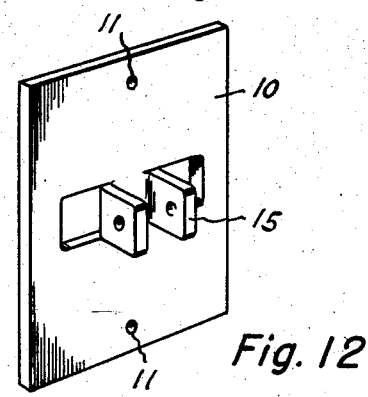
Fig. 12 is a view in perspective of the supporting plate for the valve.

For applying pressure within the recesses 38 and 39 in the compensating fashion which has been described, a movement-responsive element, such as the shock absorber 44, may be connected between the mechanical elements 30 and 34, the upper end of the shock absorber, or that end of the shock absorber within which pressure is momentarily created as the elements 30 and 34 move toward each other, is connected to the conductor 43, while the lower end of the shock absorber, or that end of the absorber within which pressure is created as the elements 30 and 34 move away from one another, is connected to the conductor 41. Thus, as the mechanical elements 30 and 34 to tend to move toward one another and to lift the rod 14, as shown in Fig. 10, the shock absorber 44 will be contracted, supplying pressure to the recess 39 and causing the recess to distort the block 12 and close the passage 20, thereby preventing the opening of the passage 20 for admission of fluid under pressure to the bellows unit 35. Similarly, momentary downward movement of the element 34 with respect to the element 30 so as to expand the shock absorber 44 will apply a momentary pressure through the conductor 41 to the recess 38, thus distorting the portion of the block 12 immediately adjacent the passage 19, and momentarily preclude the opening of the passage 19 by the downward swinging of the rod 14, as shown in Fig. 11, and thus prevent the exhausting of pressure fluid from the bellows 35.

In this manner, the valve structure may be prevented from responding to momentary movements or rapidly varying movements and causing erratic operation of the bellows structure 35. Of course, sustained movement will still result in proper actuation of the bellows since the effect of the compensating arrangement is only of short duration.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid-controlling valve structure including, a supporting plate, a flexing plate, an elastic resilient body between the plates, an actuating member extending through the body and clamping the plates thereto, the body having a fluid passage on each side of the actuating member and extending transversely thereto, and fluid conductors connected to said fluid passages.

2. A fluid-controlling valve structure including, a pair of spaced plates, a rubber-like body betweeen the plates having a pair of spaced fluid passages therein, and an actuating member pivotally connected to one plate and extending through the body between the fluid passages and through the opposite plate.

3. A fluid-controlling valve structure as set forth in claim 2, wherein the body is provided with internal recesses, one adjacent each of the fluid passages for the reception of a pressure fluid.

4. A fluid-controlling valve structure including, a supporting plate, a flexing plate, an elastic resilient body between the plates, and an actuating member extending through the body and clamping the plates thereto, the body having a fluid passage on each side of the actuating member and extending transversely thereto, the actuating member being pivotally connected to the supporting plate, and retaining means on the member urging the flexing plate toward the supporting plate and distorting the resilient body between the plates.

5. A fluid-controlling valve structure including, a supporting plate, a flexing plate, an elastic resilient body between the plates, and an actuating member extending through the body and clamping the plates thereto, the body having a fluid passage on each side of the actuating member and extending transversely thereto, the actuating member being pivotally connected to the supporting plate, and retaining means on the member urging the flexing plate toward the supporting plate and positioned to distort the resilient body between the plates to an extent sufficient to close both fluid passages when the actuating member is normal to the supporting plates.

6. A system for regulating the spacing between two structural elements movable with respect to one another including; a fluid-controlling valve structure comprising, a supporting plate mounted upon one of the structural elements, an elongate actuating rod pivotally connected between the supporting plate and the other structural element and extending approximately at right angles to the direction of relative movement between the two structural elements, a flexing plate carried by the rod adjacent the supporting plate, a resilient block of rubber-like material clamped between the supporting plate and the flexing plate, the block having transverse flow passages above and below the rod, a pressure-responsive expansible member having a pressure fluid inlet and an exhaust outlet positioned between and engaging the two structural elements, a pressure fluid connection to one end of one of the flow passages, a conductor connecting the opposite end of that passage to the pressure fluid inlet of the expansible member, an exhaust connection to one end of the other flow passage, a second conductor connecting the opposite end of the latter flow passage to the exhaust outlet of the expansible member, and means for producing momentary surges of pressure fluid when the two structural elements move toward and away from each other, the resilient block having a recess adjacent each of the flow passages, and means for conducting the surges of pressure fluid to said recesses.

7. A system for regulating the spacing between two structural elements movable with respect to one another including; a fluid-controlling valve structure comprising, a supporting plate mounted upon one of the structural elements, an elongate actuating rod pivotally connected between the supporting plate and the other structural element and extending approximately at right angles to the direction of relative movement between the two structural elements, a flexing plate carried by the rod adjacent the supporting plate, a resilient block of rubber-like material clamped between the supporting plate and the flexing plate, the block having transverse flow passages above and below the rod, a pressure-responsive expansible member having a pressure fluid inlet and an exhaust outlet positioned between and engaging the two structural elements, a pressure fluid connection to one end of the lower flow passage, a conductor connecting the opposite end of the lower passage to the pressure fluid inlet of the expansible member, an exhaust connection to one end of the upper flow passage, a second conductor connecting the opposite end of the upper flow passage to the exhaust outlet of the expansible member, surge means connected between the two structural elements for producing a first momentary surge of pressure fluid when the structural elements move toward one another and a second momentary surge of pressure fluid when the structural elements move away from one another, the surge means having pressure fluid outlets for said first and second surges, the resilient block having a recess adjacent each of the flow passages, a first pressure connection between the first surge outlet of the surge means and the recess adjacent the lower flow passage, and a second pressure connection between the second surge outlet of the surge means and the recess adjacent the upper flow passage.

8. A fluid-controlling valve structure including, a fixed plate, a movable plate, a rubber-like body between the plates, the movable plate being movable about an axis parallel to the fixed plate so as to distort alternately a first section on one side of the axis and then a second section of the rubber-like body on the other side of the axis, the rubber-like body having therein a first fluid passage in the first section on one side of said axis and a second fluid passage in the second section on the other side of said axis, an actuating member for moving the movable plate about said axis, and fluid conductors connected to said fluid passages.

9. A fluid-controlling valve structure as set forth in claim 8, and means for clamping the movable plate to the fixed plate for distorting the rubber-like body sufficiently to close both fluid passages when the two plates are parallel.

10. A fluid-controlling valve structure as set forth in claim 8, and means in the rubber-like body for distorting the body to close the fluid passages.

References Cited in the file of this patent

UNITED STATES PATENTS

| | | |
|---|---|---|
| 1,330,512 | Billinghurst | Feb. 10, 1920 |
| 1,990,517 | Bedford | Feb. 12, 1935 |
| 2,361,575 | Thompson | Oct. 31, 1944 |
| 2,670,201 | Rossman | Feb. 23, 1954 |